(12) United States Patent
Shiraki

(10) Patent No.: US 10,306,147 B2
(45) Date of Patent: May 28, 2019

(54) IMAGE PROCESSING DEVICE, IMAGE PROCESSING METHOD, PROGRAM, AND ENDOSCOPE DEVICE

(71) Applicant: SONY CORPORATION, Tokyo (JP)

(72) Inventor: Hisakazu Shiraki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/020,756

(22) Filed: Jun. 27, 2018

(65) Prior Publication Data

US 2018/0309933 A1    Oct. 25, 2018

Related U.S. Application Data

(63) Continuation of application No. 14/618,240, filed on Feb. 10, 2015, now Pat. No. 10,021,306.

(30) Foreign Application Priority Data

Mar. 12, 2014    (JP) ................... 2014-048336

(51) Int. Cl.
| | |
|---|---|
| *G06K 9/00* | (2006.01) |
| *H04N 5/232* | (2006.01) |
| *G06K 9/20* | (2006.01) |
| *G06T 5/00* | (2006.01) |

(Continued)

(52) U.S. Cl.
CPC ....... *H04N 5/23267* (2013.01); *G06K 9/2018* (2013.01); *G06K 9/2027* (2013.01); *G06T 5/003* (2013.01); *G06T 7/20* (2013.01); *G06T 2207/10016* (2013.01); *G06T 2207/20201* (2013.01); *H04N 2005/2255* (2013.01)

(58) Field of Classification Search
CPC .......... G06K 9/2018; G06T 5/003; G06T 7/20
USPC ............................................ 348/68
See application file for complete search history.

(56) References Cited

U.S. PATENT DOCUMENTS

2001/0055462 A1    12/2001 Seibel
2004/0047415 A1    3/2004 Robert
(Continued)

FOREIGN PATENT DOCUMENTS

| CN | 102316247 A | 1/2012 |
|---|---|---|
| JP | 2007-313171 A | 12/2007 |
| JP | 2012-024283 A | 2/2012 |

OTHER PUBLICATIONS

Office Action dated Jan. 3, 2019 in Chinese Patent Application No. 201510097464.3, with English translation.

*Primary Examiner* — Jeffery A Williams
(74) *Attorney, Agent, or Firm* — Oblon, McClelland, Maier & Neustadt, L.L.P.

(57) ABSTRACT

An image processing device includes an input unit which inputs ordinary frames in a state in which an object is irradiated with ordinary light, and a special frame in a state in which the object is irradiated with special light, which are imaged consecutively at a predetermined ratio according to a predetermined frame period; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

20 Claims, 8 Drawing Sheets

(51) Int. Cl.
*G06T 7/20* (2017.01)
*H04N 5/225* (2006.01)

(56) References Cited

U.S. PATENT DOCUMENTS

| | | | |
|---|---|---|---|
| 2011/0205367 A1* | 8/2011 | Brown | H04N 5/2256 348/164 |
| 2011/0237895 A1* | 9/2011 | Yoshida | A61B 1/00009 600/180 |
| 2015/0223700 A1* | 8/2015 | Kirenko | A61B 5/0205 600/473 |

* cited by examiner

IMAGE PROCESSING DEVICE, IMAGE PROCESSING METHOD, PROGRAM, AND ENDOSCOPE DEVICE

CROSS REFERENCE TO RELATED APPLICATIONS

This application is a continuation of U.S. patent application Ser. No. 14/618,240, filed Feb. 10, 2015, which claims the benefit of Japanese Priority Patent Application No. JP 2014-048336 filed Mar. 12, 2014, the entire contents of which are incorporated herein by reference.

BACKGROUND

The present disclosure relates to an image processing device, an image processing method, a program, and an endoscope device. In particular, the present disclosure relates to an image processing device, an image processing method, a program, and an endoscope device, each of which is capable of combining and displaying an ordinary image which is imaged by irradiating a human body with ordinary light such as white light, and a special image which is obtained by irradiating the human body with a special light and illustrates the position of blood vessels.

In the related art, for example, with the intention of usage in a medical setting, various technologies are proposed in which an ordinary image of an organ or the like that is imaged by an endoscope device is combined with a special image that represents the position of blood vessels or a lesion such as a tumor, which are difficult to discern in the ordinary image, and the result is displayed.

For example, imaging an ordinary image and a special image using time division is described in Japanese Unexamined Patent Application Publication No. 2007-313171. As another example, performing composite display of the ordinary image and the special image is described in Japanese Unexamined Patent Application Publication No. 2012-24283.

Here, the term "ordinary image" indicates an image which is imaged by irradiating an organ or the like that serves as the object with ordinary light such as white light. Hereinafter, the ordinary image will also be referred to as an ordinary frame. The term "special image" indicates an image which is imaged by irradiating the object with special light of a predetermined wavelength different from that of the ordinary light. Hereinafter, the special image will also be referred to as the special frame. Note that, when imaging the special image, there is a case in which a fluorescent agent or the like which reacts to the irradiation of the special light is mixed into or applied to the blood vessel (the blood) or the lesion that serves as the object.

SUMMARY

Since combining the ordinary frame and the special frame that are imaged using time division causes a shift in the imaging timing, when there is hand shaking or the object moves, there is a likelihood that the alignment of the ordinary frame with the special frame may not be performed accurately.

Note that, technology also exists which carries out the compositing after detecting motion vectors between the ordinary frame and the special frame that are imaged using time division and motion correction is performed based on the motion vectors. However, the imaging conditions differ between the ordinary frame and the special frame, errors occur easily in block matching when detecting the motion vectors, and it is difficult to accurately detect the motion vectors.

It is desirable to enable the accurate alignment and combination of an ordinary frame and a special frame that are imaged using time division.

According to a first embodiment of the present disclosure, there is provided an image processing device which includes an input unit which inputs ordinary frames in a state in which an object is irradiated with ordinary light, and a special frame in a state in which the object is irradiated with special light, which are imaged consecutively at a predetermined ratio according to a predetermined frame period; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

In the image processing device, the image processing device may further include a feature extraction process unit which generates a feature extraction frame by subjecting the special frame to a feature extraction process, the motion correction unit may further subject the feature extraction frame to motion correction corresponding to the imaging timing of the ordinary frames based on the detected motion vectors, and the compositing unit may subject the ordinary frames to the image compositing process based on the feature extraction frame that is subjected to motion correction.

In the image processing device, the feature extraction process unit may generate a differential filter frame as the feature extraction frame by subjecting the special frame to a differential filter process.

In the image processing device, the compositing unit may subject the ordinary frames to a superposing compositing process or a marking compositing process as the image compositing process.

In the image processing device, as the superposing compositing process, the compositing unit may add the motion-corrected special frame to the ordinary frames according to the motion-corrected feature extraction frame.

In the image processing device, as the marking compositing process, the compositing unit may subject the ordinary frames to a color conversion process according to the motion-corrected feature extraction frame.

In the image processing device, the compositing unit may subject the ordinary frames to a superposing compositing process or a marking compositing process as the image compositing process according to a selection by a user.

In the image processing device, the image processing device may further include a motion vector correction unit which corrects the detected motion vectors based on the plurality of motion vectors that are consecutively detected.

According to a first embodiment of the present disclosure, there is provided an image processing method performed by an image processing device. The method includes inputting ordinary frames in a state in which an object is irradiated with ordinary light, and a special frame in a state in which the object is irradiated with special light, which are imaged consecutively at a predetermined ratio according to a predetermined frame period; detecting motion vectors of the object from a plurality of the ordinary frames with different imaging timing; subjecting the special frame to motion correction corresponding to the imaging timing of the ordinary frames based on the detected motion vectors; and subjecting the ordinary frames to an image compositing process based on the special frame.

According to a first embodiment of the present disclosure, there is provided a program for causing a computer to function as an input unit which inputs ordinary frames in a state in which an object is irradiated with ordinary light, and a special frame in a state in which the object is irradiated with special light, which are imaged consecutively at a predetermined ratio according to a predetermined frame period; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

In the first embodiments of the present disclosure, ordinary frames in a state in which an object is irradiated with ordinary light, and a special frame in a state in which the object is irradiated with special light, which are imaged consecutively at a predetermined ratio according to a predetermined frame period are input; motion vectors of the object from a plurality of the ordinary frames with different imaging timing are detected; the special frame is subjected to motion correction corresponding to the imaging timing of the ordinary frames based on the detected motion vectors; and the ordinary frames are subjected to an image compositing process based on the special frame.

According to a second embodiment of the present disclosure, there is provided an endoscope device which includes a light source unit which irradiates an object with ordinary light or special light; an imaging unit which consecutively images, at a predetermined ratio according to a predetermined frame period, ordinary frames in a state in which the object is irradiated with the ordinary light, and a special frame in a state in which the object is irradiated with the special light; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

In the second embodiment of the present disclosure, an object is irradiated with ordinary light or special light; ordinary frames in a state in which the object is irradiated with the ordinary light, and a special frame in a state in which the object is irradiated with the special light are consecutively imaged at a predetermined ratio according to a predetermined frame period; motion vectors of the object are detected from a plurality of the ordinary frames with different imaging timing; the special frame is subjected to motion correction corresponding to the imaging timing of the ordinary frames based on the detected motion vectors; and the ordinary frames are subjected to an image compositing process based on the special frame.

According to the first embodiments of the present disclosure, it is possible to accurately align and combine ordinary frames and a special frame that are images using time division.

According to the second embodiment of the present disclosure, it is possible to image ordinary frames and a special frame using time division, and to accurately align and combine the frames.

DETAILED DESCRIPTION OF EMBODIMENTS

Figure 1:
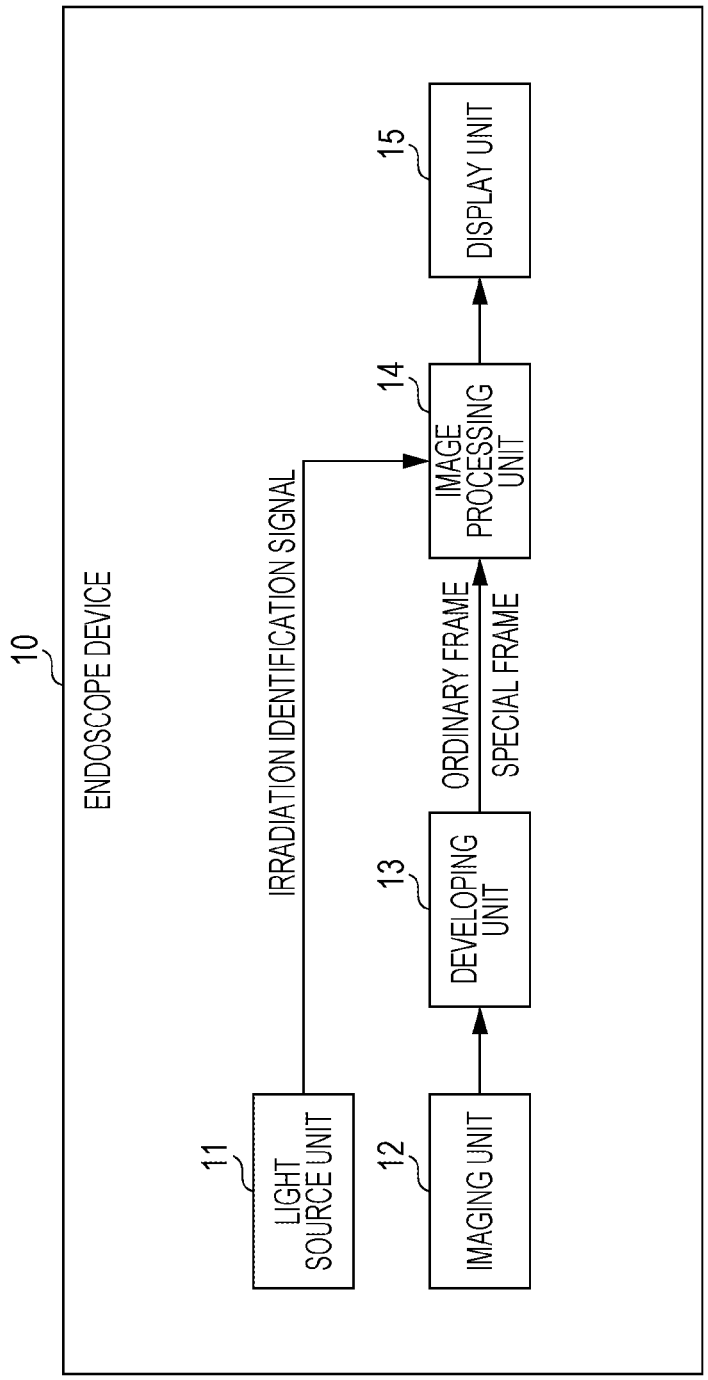
FIG. 1 is a block diagram illustrating a configuration example of an endoscope device to which an embodiment of the present disclosure is applied.

Hereafter, detailed description will be given of a favorable embodiment for realizing the present disclosure (referred to below as the "embodiment") with reference to the drawings.
Configuration Example of Endoscope Device FIG. 1 illustrates a configuration example of an endoscope device, which is an embodiment of the present disclosure, that images an ordinary frame and a special frame using time division, accurately aligns and combines the frames, and displays a composite frame that is obtained as a result.

An endoscope device 10 is configured to include a light source unit 11, an imaging unit 12, a developing unit 13, an image processing unit 14, and a display unit 15.

The light source unit 11 switches between ordinary light such as white light and special light that has a predetermined wavelength for each frame that is imaged, and irradiates the object (an organ or the like in the body) therewith. The light source unit 11 outputs an irradiation identification signal indicating which of the ordinary light and the special light the object is irradiated with to the image processing unit 14 for each frame that is imaged. Note that, when irradiating the object with the special light, an optical filter which transmits only a predetermined wavelength may be provided in the light path of the ordinary light.

The imaging unit 12 images the object in a state in which the ordinary light or the special light is radiated from the light source unit 11, and outputs an image signal that is obtained as a result to the developing unit 13. The developing unit 13 subjects the image signal that is input thereto from the imaging unit 12 to a developing process such as a mosaic process, and outputs the image signal resulting from the process (the ordinary frame when the ordinary light is radiated, and the special frame when the special light is radiated) to the image processing unit 14.

Here, in the special frame, the blood vessel or the lesion such as a tumor is made clearer in comparison to in an ordinary frame; however, in contrast, the brightness of the entire frame is dark and there is much noise.

Meanwhile, in the ordinary frame, the entire frame is bright in comparison to the special frame, and there is little noise; however, in contrast, it is difficult to distinguish the blood vessel or the lesion such as a tumor.

The image processing unit 14 detects motion vectors using two ordinary frames with different imaging timing. By subjecting the special frame to a differential filter process, the image processing unit 14 generates a frame (hereinafter referred to as a differential filter frame) in which edge portions (specifically, the contours or the like of the blood vessel or the lesion, for example) within the image are emphasized. Furthermore, the image processing unit 14 performs motion correction on each of the special frame and the differential filter frame based on the motion vectors that are detected from the ordinary frame, combines the ordinary frame with the special frame and the differential filter frame which are subjected to the motion correction, and outputs the composite frame that is obtained as a result to the display unit 15.

The display unit 15 displays the composite frame.

Imaging Timing of Ordinary Frame and Special Frame

Figure 2:
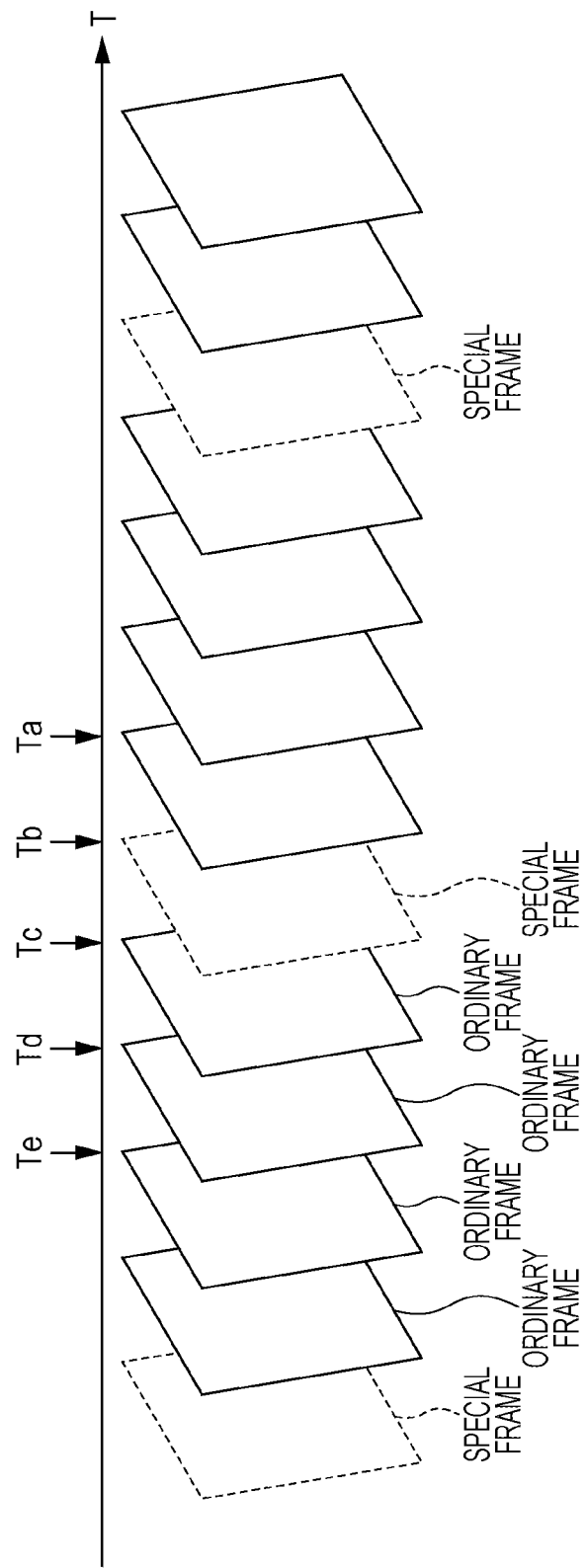
FIG. 2 is a diagram illustrating imaging timing between ordinary frames and special frames.

Next, an example of the imaging timing of the ordinary frames and the special frames is illustrated in FIG. 2.

In the endoscope device 10, ordinary frames are imaged for several continuous frames, and a special frame is imaged periodically between the ordinary frames. For example, as illustrated in FIG. 2, the imaging ratio of ordinary frames to special frames is set to 4:1.

However, the ratio is not limited to 4:1, and may be variable. In FIG. 2, Ta illustrates a timing at which an ordinary frame is imaged one frame before a special frame is imaged, Tb illustrates a timing at which a special frame is imaged, and Tc, Td, and Te illustrate timings at which ordinary frames are imaged 1, 2, and 3 frames, respectively, after the special frame is imaged. Ta to Te will be used in the description of the detection of motion vectors described later.

Configuration Example of Image Processing Unit 14

Figure 3:
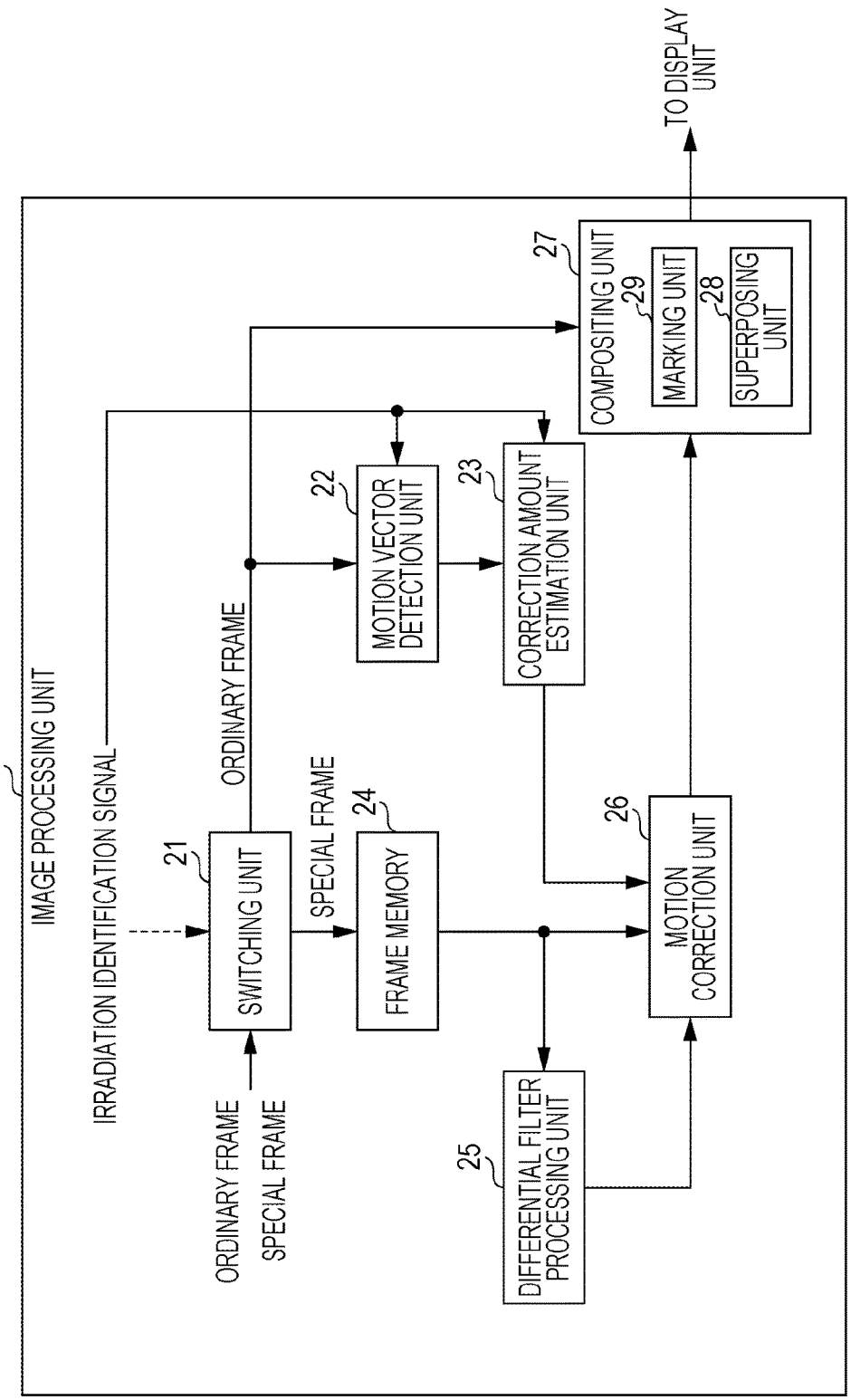
FIG. 3 is a block diagram illustrating a detailed configuration example of an image processing unit of FIG. 1.

Next, a configuration example of the image processing unit 14 is illustrated in FIG. 3.

The image processing unit 14 is configured to include a switching unit 21, a motion vector detection unit 22, a correction amount estimation unit 23, a frame memory 24, a differential filter processing unit 25, a motion correction unit 26, and a compositing unit 27.

In the image processing unit 14, the ordinary frames and the special frames that are input thereto from the developing unit 13 of the previous stage are input to the switching unit 21, and the irradiation identification signal from the light source unit 11 is input to the switching unit 21, the motion vector detection unit 22, and the correction amount estimation unit 23.

The switching unit 21 determines whether or not the input from the developing unit 13 is a special frame based on the irradiation identification signal, when the input is not a special frame (is an ordinary frame), outputs the ordinary frame to the motion vector detection unit 22 and the compositing unit 27, and when the input is a special frame, the special frame is output to the frame memory 24.

For each frame period, the motion vector detection unit 22 detects the motion vectors using two ordinary frames with different imaging timing, and outputs the detected motion vectors to the correction amount estimation unit 23.

The correction amount estimation unit 23 estimates the motion correction amounts of the special frame and the differential filter frame based on the motion vectors that are detected by the motion vector detection unit 22, and outputs the estimated motion correction amounts to the motion correction unit 26. Note that, the correction amount estimation unit 23 is capable of correcting motion vectors which may be erroneously detected based on the motion vectors that are detected in succession, and is capable of estimating the motion correction amounts based on the corrected motion vectors.

The frame memory 24 holds the special frame that is input thereto from the switching unit 21, and supplies the held special frame to the differential filter processing unit 25 and the motion correction unit 26 for each frame period. The frame memory 24 updates the held special frame when the next special frame is input thereto from the switching unit 21.

The differential filter processing unit 25 generates a feature extraction frame in which features in the image are emphasized by subjecting the special frame that is supplied thereto from the frame memory 24 to a differential filter process (for example, the Sobel filter process), and outputs the feature extraction frame to the motion correction unit 26. Note that, in the case of the differential filter process, a differential filter frame in which the edge portions are emphasized is generated as the feature extraction frame. As described above, since the frame memory 24 supplies the special frame held therein for each frame period, the same special frames are consecutively supplied. In this case, the differential filter processing unit 25 may omit the differential filter process and output the result of the previous differential filter process to the motion correction unit 26.

Note that, as described above, instead of generating the differential filter frame using the differential filter process, for example, a process may be executed in which a region in which the variance or the dynamic range in a micro-block (of 3×3 pixels, for example) is greater than or equal to a threshold that is extracted, and a feature extraction frame indicating the extraction results is generated. As another example, a process may be executed in which a region in which the signal levels of pixels are within a specific threshold, that is, a region with specific RGB levels is extracted, and a feature extraction frame indicating the extraction results is generated. As still another example, a closed region (corresponding to a tumor or the like) may be subjected to a contour detection process such as snakes, and a feature extraction frame indicating the results may be generated.

The motion correction unit 26 subjects the special frame from the frame memory 24 to the motion correction based on the motion correction amounts that are input from the correction amount estimation unit 23, subjects the differential filter frame from the differential filter processing unit 25 to the motion correction, and outputs the post-motion correction special frame and differential filter frame to the compositing unit 27.

The compositing unit 27 includes a superposing unit 28 and a marking unit 29, using the ordinary frame and the post-motion correction special frame and differential filter frame as the input, generates a composite frame by performing a superposing compositing process by the superposing unit 28 or a marking compositing process by the marking unit 29, and outputs the composite frame to the display unit 15 of the subsequent stage.

Configuration Example of Motion Vector Detection Unit 22

Figure 4:
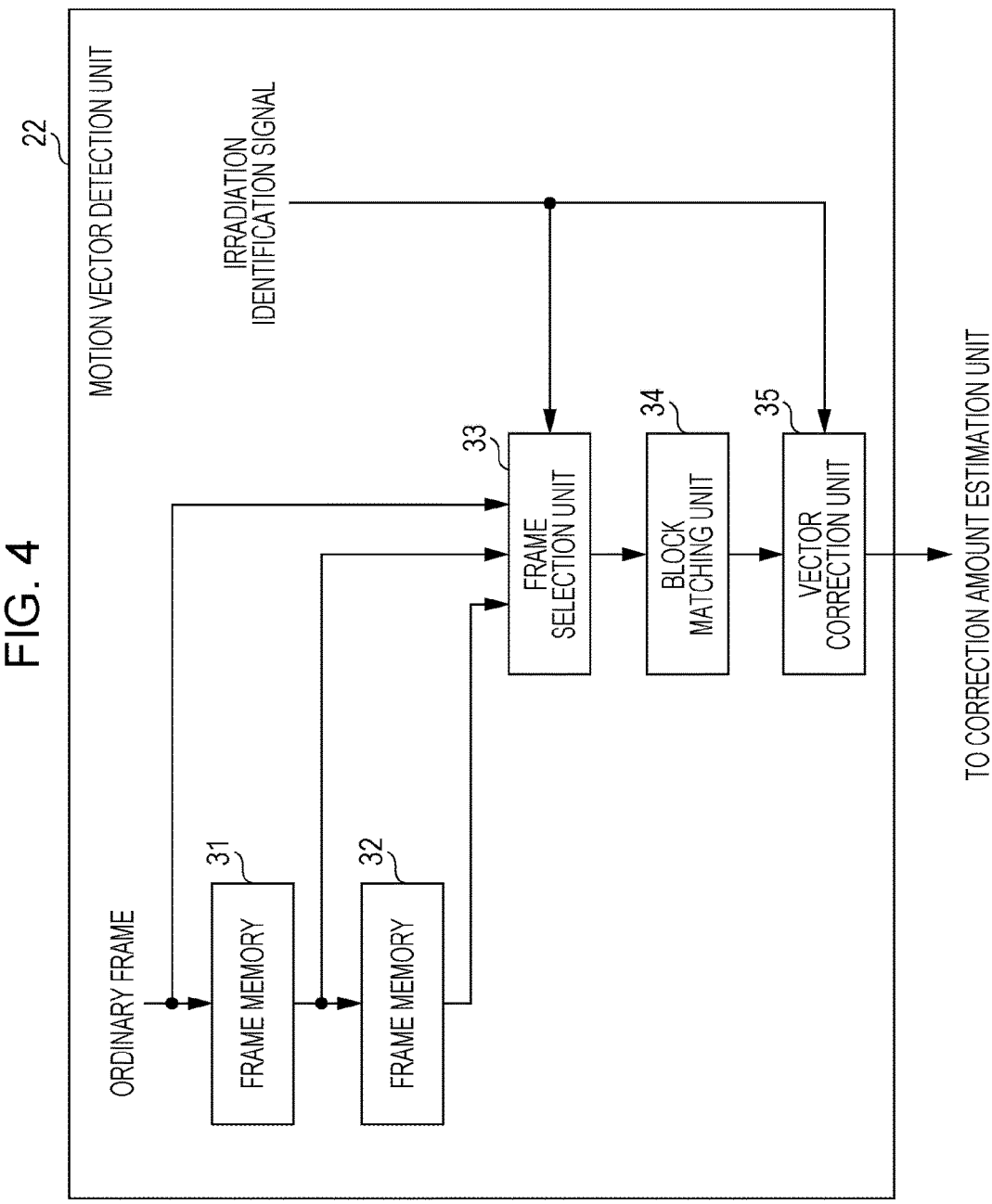
FIG. 4 is a block diagram illustrating a detailed configuration example of a motion vector detection unit of FIG. 3.

Next, a configuration example of the motion vector detection unit 22 is illustrated in FIG. 4. The motion vector detection unit 22 is configured to include frame memories 31 and 32, a frame selection unit 33, a block matching unit 34, and a vector correction unit 35.

In the motion vector detection unit 22, the ordinary frame that is input thereto from the switching unit 21 of the previous stage is input to the frame memory 31 and the frame selection unit 33.

For each frame period, the frame memory 31 outputs the ordinary frame that is held therein until that point to the frame memory 32 and the frame selection unit 33, and updates the data held therein until that point with the ordinary frame that is input from the switching unit 21 of the previous stage. In the same manner, for each frame period, the frame memory 32 outputs the ordinary frame that is held therein to the frame selection unit 33, and updates the data held therein with the ordinary frame that is input from the frame memory 31 of the previous stage.

However, among frame periods, at a timing at which the ordinary frame is not input to the motion vector detection unit 22, the frame memory 31 outputs the ordinary frame that is held until that point to the subsequent stage, and clears the data that is held until that point.

At the next timing, since the frame memory 31 is not holding any data, the output to the subsequent stage is not performed. The frame memory 32 outputs the ordinary frame that is held until that point to the subsequent stage, and clears the data that is held until that point.

Therefore, two or three ordinary frames with different imaging timing are input to the frame selection unit 33 at the same time.

When two ordinary frames are input to the frame selection unit 33 at the same time, the two ordinary frames are output to the block matching unit 34. When three ordinary frames are input to the frame selection unit 33 at the same time, the two ordinary frames that are input from the frame memories 31 and 32 are output to the block matching unit 34. The block matching unit 34 detects the motion vectors between the two ordinary frames using a block matching process.

The vector correction unit 35 determines the relationship between the two ordinary frames that are used for the motion vectors based on the irradiation identification signal, corrects the detected motion vectors based on the relationship, and outputs the motion vectors to the correction amount estimation unit 23.

Detailed description will be given of the correction of the motion vectors by the vector correction unit 35. If the output from the frame memory 31 is used as a reference, when the reference imaging timing is the Ta illustrated in FIG. 2, the ordinary frame from the frame memory 32 that is one frame prior to the reference, and the reference ordinary frame from the frame memory 31 are input to the frame selection unit 33, and the motion vectors are detected from the two ordinary frames. In this case, the vector correction unit 35 does not perform the motion vector correction.

When the reference imaging timing is the Tb illustrated in FIG. 2, since the Tb is the imaging timing of the special frame, the frame memory 31 does not perform output. The ordinary frame from the frame memory 32 that is one frame prior to the reference, and the ordinary frame from the switching unit 21 that is one frame after the reference are input to the frame selection unit 33, and the motion vectors are detected from the two ordinary frames. In that case, since the detected motion vectors are from between ordinary frames that are two frames separated from each other, the vector correction unit 35 multiplies each of the vertical and horizontal components of the detected motion vectors by ½.

When the reference imaging timing is the Tc illustrated in FIG. 2, the reference ordinary frame from the frame memory 31, and the ordinary frame from the switching unit 21 that is one frame after the reference are input to the frame selection unit 33, and the motion vectors are detected from the two ordinary frames. In that case, since the directions of the detected motion vectors oppose each other, the vector correction unit 35 multiplies each of the vertical and horizontal components of the detected motion vectors by −1.

When the reference imaging timing is the Td illustrated in FIG. 2, the ordinary frame from the frame memory 32 that is one frame prior to the reference, the reference ordinary frame from the frame memory 31, and the ordinary frame from the switching unit 21 that is one frame after the reference are input to the frame selection unit 33, and the motion vectors are detected from the two ordinary frames from the frame memories 31 and 32. In this case, the vector correction unit 35 does not perform the motion vector correction.

When the reference imaging timing is the Te illustrated in FIG. 2, the ordinary frame from the frame memory 32 that is one frame prior to the reference, the reference ordinary frame from the frame memory 31, and the ordinary frame from the switching unit 21 that is one frame after the reference are input to the frame selection unit 33, and the motion vectors are detected from the two ordinary frames from the frame memories 31 and 32. In this case, the vector correction unit 35 does not perform the motion vector correction.

The motion vectors that are corrected as described above are output from the vector correction unit 35 to the correction amount estimation unit 23 of the subsequent state.

Image Compositing Process by Image Processing Unit 14

Next, description will be given of the image compositing process by the image processing unit 14 with reference to FIG. 5.

Figure 5:
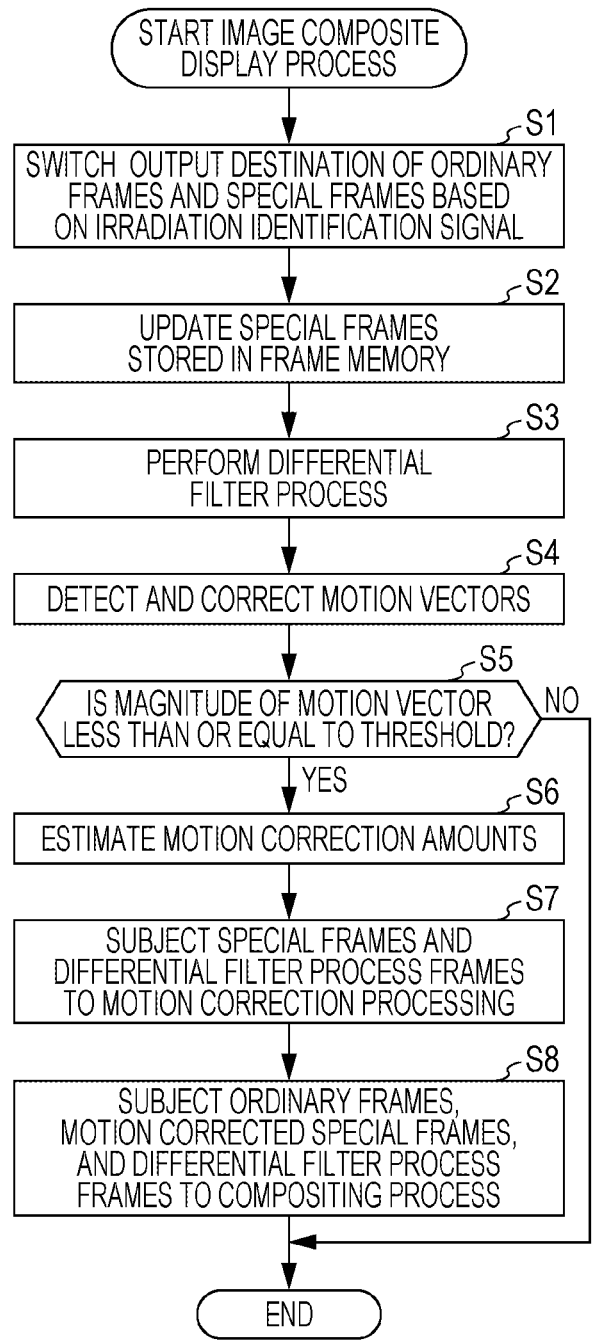
FIG. 5 is a flowchart illustrating an image compositing process.

FIG. 5 is a flowchart illustrating an image compositing process. The image compositing process is executed for each frame period.

In step S1, the switching unit 21 determines whether or not the input from the developing unit 13 is a special frame based on the irradiation identification signal, and when the input is a special frame, the special frame is output to the frame memory 24. Conversely, when it is determined that the input is not a special frame (is an ordinary frame), the switching unit 21 outputs the ordinary frame to the motion vector detection unit 22 and the compositing unit 27.

In step S2, the frame memory 24 supplies the special frame that is held until that point to the differential filter processing unit 25 and the motion correction unit 26. Note that, the frame memory 24 updates the held special frame when the special frame is input thereto from the switching unit 21.

In step S3, the differential filter processing unit 25 generates a differential filter frame in which edge portions in the image are emphasized by subjecting the special frame that is supplied thereto from the frame memory 24 to a differential filter process (for example, the Sobel filter process such as the one illustrated in the following equation (1)), and outputs the differential filter frame to the motion correction unit 26.

$$\text{Sobel}_{Rh}(x,y)=|-R(x-1,y-1)-2R(x-1,y)-R(x-1,y-1)+R(x+1,y-1)+2R(x+1,y)+R(x+1,y+1)|$$

$$\text{Sobel}_{Rv}(x,y)=|-R(x-1,y-1)-2R(x,y-1)-R(x+1,y-1)+R(x-1,y+1)+2R(x,y+1)+R(x+1,y+1)|$$

$$\text{Sobel}_{R}(x,y)=\text{Sobel}_{Rh}(x,y)+\text{Sobel}_{Rv}(x,y)$$

$$\text{Sobel}_{Gh}(x,y)=|-G(x-1,y-1)-2G(x-1,y)-G(x-1,y+1)+G(x+1,y-1)+2G(x+1,y)+G(x+1,y+1)|$$

$$\text{Sobel}_{Gv}(x,y)=|-G(x-1,y-1)-2G(x,y-1)-G(x+1,y-1)+G(x-1,y+1)+2G(x,y+1)+G(x+1,y+1)|$$

$$\text{Sobel}_{G}(x,y)=\text{Sobel}_{Gh}(x,y)+\text{Sobel}_{Gv}(x,y)$$

$$\text{Sobel}_{Bh}(x,y)=|-B(x-1,y-1)-2B(x-1,y)-B(x-1,y+1)+B(x+1,y-1)+2B(x-1,y)+B(x+1,y+1)|$$

$$\text{Sobel}_{Bv}(x,y)=|-B(x-1,y-1)-2B(x,y-1)-B(x+1,y-1)+B(x-1,y+1)+2B(x,y+1)+B(x+1,y+1)|$$

$$\text{Sobel}_B(x,y)=\text{Sobel}_{Bh}(x,y)+\text{Sobel}_{Bv}(x,y)$$

Note that, R, G, and B in the equation (1) respectively correspond to levels in the R, G, and B planes of the special frame.

In step S4, the motion vector detection unit 22 detects the motion vectors using two ordinary frames with different imaging timing, and outputs the motion vectors to the correction amount estimation unit 23. In step S5, the correction amount estimation unit 3 determines whether or not the detected motion vectors are less than or equal to a predetermined threshold, and when the detected motion vectors are less than or equal to the predetermined threshold, the process proceeds to step S6 in order to use the motion vectors in the motion correction. Conversely, when the detected motion vectors are greater than the predetermined threshold, the motion vectors are not used in the motion correction. In this case, the image compositing process that corresponds to the present imaging timing ends.

In step S6, the correction amount estimation unit 23 estimates the motion correction amounts of the special frame and the differential filter frame based on the motion vectors that are detected by the motion vector detection unit 22, and outputs the estimated motion correction amounts to the motion correction unit 26. Specifically, for example, the motion correction amounts $H_x$ and $H_y$ are computed as illustrated in the following equation (2).

$$H_x = \sum_{t=1}^{N} V_{x,t} \quad (2)$$

$$H_y = \sum_{t=1}^{N} V_{y,t}$$

In the equation (2), $V_x$ and $V_y$ are motion vectors that are detected and corrected, N represents the imaging timing t=N of the ordinary frame for which the motion vectors are detected in relation to the imaging timing t=0 of the special frame for which correction is performed.

Note that, in the correction amount estimation unit 23, it is also possible to correct the dispersion in the motion vectors and subsequently estimate the motion correction amounts based on the series of motion vectors, as described hereinafter, as another motion correction amount estimation method.

Figure 6:
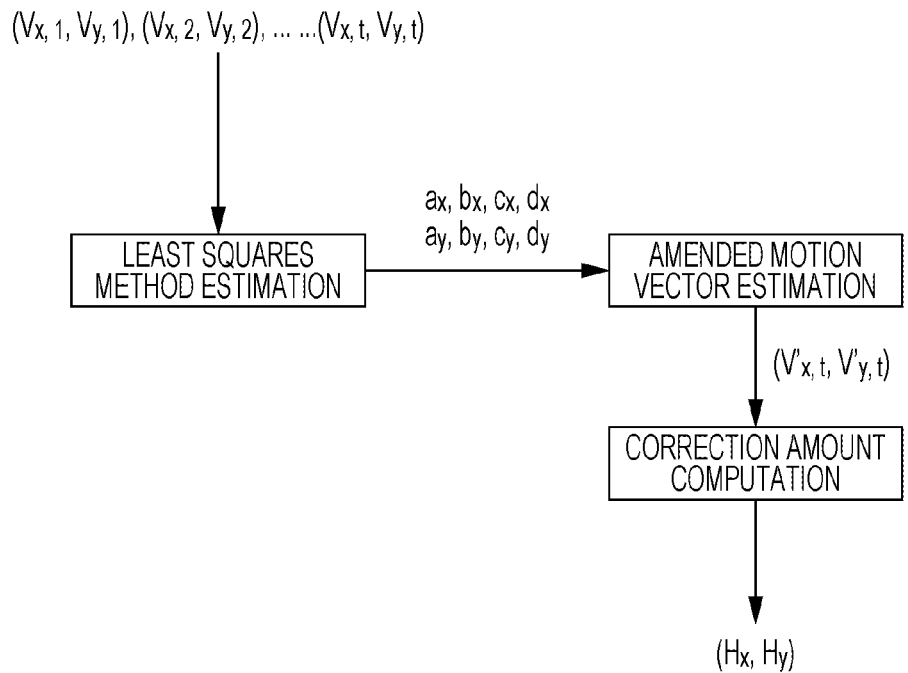
FIG. 6 is a diagram illustrating an example of motion correction amount estimation.
Figure 7:
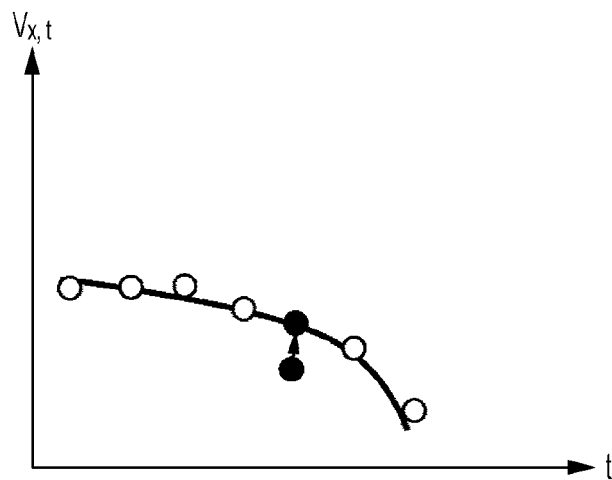
FIG. 7 is a diagram illustrating an impression of correcting dispersion in motion vectors based on a series of motion vectors.

FIG. 6 is a diagram illustrating a process flow in which the dispersion in the motion vectors is corrected and the motion correction amounts are subsequently estimated based on the series of motion vectors. FIG. 7 illustrates an impression of correcting the dispersion in the motion vectors based on the series of motion vectors.

Specifically, the motion vectors ($V'_{x,t}$ and $V'_{y,t}$) in relation to the imaging timing t are estimated as illustrated in the following equation (3).

$$V'_{x,t} = a_x t^3 + b_x t^2 + c_x t + d_x$$

$$V'_{y,t} = a_y t^3 + b_y t^2 + c_y t + d_y \quad (3)$$

The motion correction amounts $H_x$ and $H_y$ are computed using the following equation (4) by substituting the motion vectors of the equation (2) with the estimated motion vectors ($V'_{x,t}$ and $V'_{y,t}$).

$$H_x = \sum_{t=1}^{N} V'_{x,t} \quad (4)$$

$$H_y = \sum_{t=1}^{N} V'_{y,t}$$

Note that, the coefficients ($a_x$, $b_x$, $c_x$, and $d_x$) and ($a_y$, $b_y$, $c_y$, and $d_y$) in the equation (3) can be calculated using the least squares method using the detected motion vectors ($V_{x,1}$ and $V_{y,1}$), . . . , ($V_{x,t}$ and $V_{y,t}$).

After the motion correction amounts are estimated as described above, the process proceeds to step S7.

In step S7, the motion correction unit 26 subjects the special frame from the frame memory 24 to the motion correction based on the motion correction amounts that are input from the correction amount estimation unit 23, subjects the differential filter frame from the differential filter processing unit 25 to the motion correction, and outputs the post-motion correction special frame and differential filter frame to the compositing unit 27. The ordinary frame, the special frame, and the differential filter frame that are input to the compositing unit 27 become frames in which the object is accurately aligned in relation to each other.

In step S8, the compositing unit 27 generates a composite frame by subjecting the ordinary frame and the post-motion correction special frame and differential filter frame to the superposing compositing process or the marking compositing process according to the selection from the user, and outputs the composite frame to the display unit 15 of the subsequent stage.

Description will be given of the superposing compositing process. As illustrated in the following equation (5), in the superposing compositing process, the result of multiplying the post-motion correction differential filter frame and special frame with each other is added to the ordinary frame.

$$O_R(x,y) = C_0 \times N_R(x,y) + C_1 \times \text{Sobel}_R(x,y) \times I_R(x,y)$$

$$O_G(x,y) = C_0 \times N_G(x,y) + C_1 \times \text{Sobel}_G(x,y) \times I_G(x,y)$$

$$O_B(x,y) = C_0 \times N_B(x,y) + C_1 \times \text{Sobel}_B(x,y) \times I_B(x,y) \quad (5)$$

In the equation (5), O(x,y) is a pixel value of the composite frame, N(x,y) is a pixel value of the ordinary frame, Sobel(x,y) is a pixel value of the post-motion correction differential filter frame, and I(x,y) is a pixel value of the post-motion correction special frame. $C_0$ and $C_1$ are coefficients that control the degree of superposition and may be arbitrarily set by the user.

Figure 8:
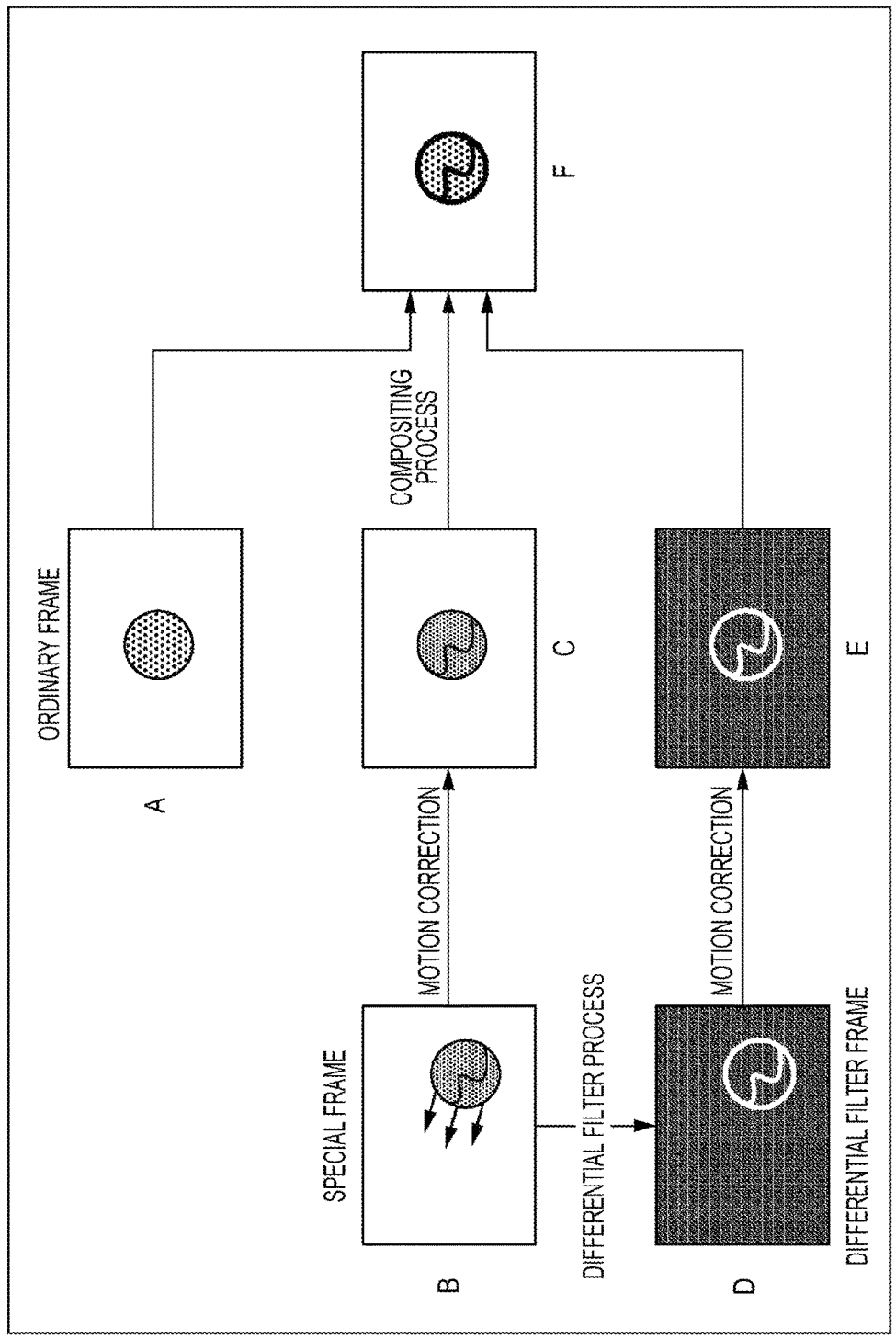
FIG. 8 is a diagram illustrating an impression of a superposing compositing process.

FIG. 8 illustrates an impression of the superposing compositing process described above. In the superposing compositing process, it is possible to obtain the composite frame in which the special frame and the differential filter frame are accurately aligned to the ordinary frame, and the edges of a portion to be focused on (a blood vessel, a lesion, or the like) are emphasized and superposed.

Next, description will be given of the marking compositing process. As illustrated in the following equation (6), in the marking compositing process, the ordinary frame is subjected to pseudo color conversion using a color matrix process according to color conversion coefficients C that are multiplied by the pixel values of the differential filter frame.

$$\begin{pmatrix} O_R(x, y) \\ O_G(x, y) \\ O_B(x, y) \end{pmatrix} = \qquad (6)$$

$$\begin{pmatrix} C_{1R} \times Sobel_R(x, y) & C_{1G} \times Sobel_G(x, y) & C_{1B} \times Sobel_B(x, y) \\ C_{2R} \times Sobel_R(x, y) & C_{2G} \times Sobel_G(x, y) & C_{1B} \times Sobel_B(x, y) \\ C_{3R} \times Sobel_R(x, y) & C_{3G} \times Sobel_G(x, y) & C_{1B} \times Sobel_B(x, y) \end{pmatrix}$$

$$\begin{pmatrix} N_R(x, y) \\ N_G(x, y) \\ N_B(x, y) \end{pmatrix}$$

In the equation (6), O(x,y) is a pixel value of the composite frame, N(x,y) is a pixel value of the ordinary frame, Sobel(x,y) is a pixel value of the post-motion correction differential filter frame, and C is a color conversion coefficient.

As is clear from the equation (6), the post-motion correction special frame is not used in the marking and superposing compositing process.

According to the marking and superposing compositing process, since the degree of color conversion is controlled according to the pixel values of the differential filter frame, the edges of the blood vessel or the like are more strongly subjected to the color conversion, and the other regions are not significantly subjected to the color conversion. Accordingly, it is possible to obtain a composite frame in which only the edges of the blood vessel or the like stand out.

The description of the image compositing process ends with the above description.

As described above, according to the endoscope device 10 that serves as the present embodiment, since the motion vectors are detected using only the ordinary frames and the motion correction amounts are estimated after correcting the detected motion vectors, it is possible to accurately execute the motion correction of the special frame and the differential filter frame. Accordingly, since it is possible to accurately align the information of the special frame of the blood vessel, the tumor, or the like in relation to the ordinary frame, it is possible to allow the user (a medical practitioner performing an operation, or the like) to accurately and clearly visually recognize a tumor portion to be removed and the blood vessel portion not to be removed.

Since the composite frame that is presented to the user is created based on the ordinary frame, a composite frame that is bright with little noise in comparison to the special frame can be presented to the user.

Incidentally, the series of processes described above can be executed using hardware, and can be executed using software. When the series of processes is executed using software, the program configuring the software is installed on a computer. Here, examples of the computer include a computer embedded within dedicated hardware, and an ordinary personal computer or the like which is capable of executing the various functions due to various programs that are installed thereon.

Figure 9:
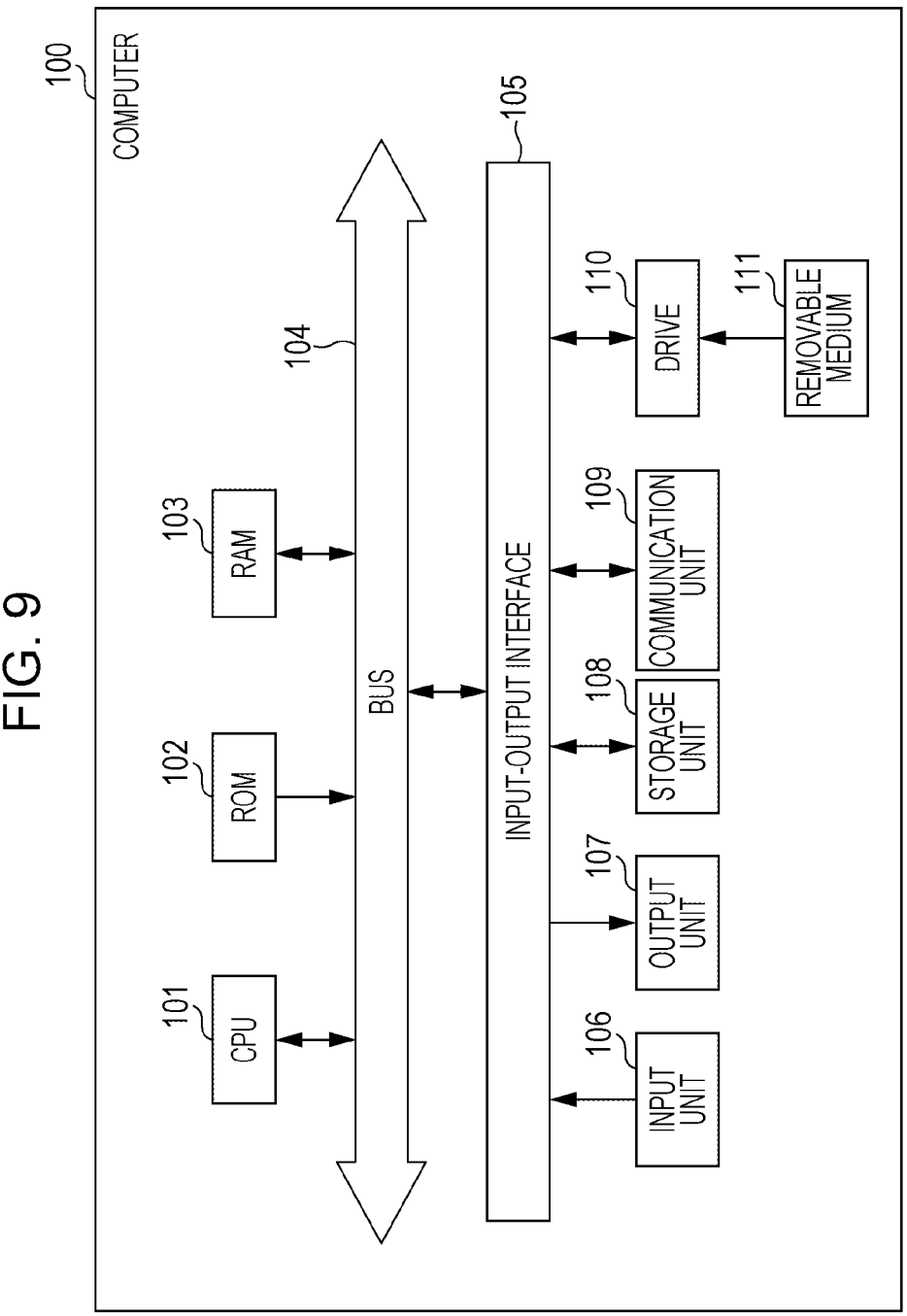
FIG. 9 is a block diagram illustrating a configuration example of a computer.

FIG. 9 is a block diagram illustrating a configuration example of the hardware of the computer which executes the series of processes described above using a program.

In a computer 100, a central processing unit (CPU) 101, a read only memory (ROM) 102, and random access memory (RAM) 103 are connected to each other by a bus 104.

Furthermore, an input-output interface 105 is connected to the bus 104. The input-output interface 105 is connected to an input unit 106, an output unit 107, a storage unit 108, a communication unit 109, and a drive 110.

The input unit 106 is formed of a keyboard, a mouse, a microphone, and the like. The output unit 107 is formed of a display, a speaker, and the like. The storage unit 108 is formed of a hard disk, non-volatile memory, or the like. The communication unit 109 is formed of a network interface or the like. The drive 110 drives a removable medium 111 such as a magnetic disk, an optical disc, a magneto-optical disc, or a semiconductor memory.

In the computer 100 configured as described above, the series of processes described above is performed by the CPU 101, for example, loading the program stored in the storage unit 108 into the RAM 103 via the input-output interface 105 and the bus 104, and executing the loaded program.

The computer 100 may be a so-called cloud computer that is connected via the Internet, for example.

Note that, the program which is executed by the computer 100 may be a program in which the processes are performed in time series in the order described in the present specification. The program may be a program in which the processes are performed in parallel or at the necessary timing such as when the process is called.

The embodiments of the present disclosure are not limited to the embodiment described above, and various modifications may be made within a scope not departing from the main concept of the present disclosure.

Furthermore, the present disclosure may adopt the following configurations.

(1) An image processing device, including an input unit which inputs ordinary frames in a state in which an object is irradiated with ordinary light, and a special frame in a state in which the object is irradiated with special light, which are imaged consecutively at a predetermined ratio according to a predetermined frame period; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

(2) The image processing device according to (1), further including a feature extraction process unit which generates a feature extraction frame by subjecting the special frame to a feature extraction process, in which the motion correction unit further subjects the feature extraction frame to motion correction corresponding to the imaging timing of the ordinary frames based on the detected motion vectors, and in which the compositing unit subjects the ordinary frames to the image compositing process based on the feature extraction frame that is subjected to motion correction.

(3) The image processing device according to (2), in which the feature extraction process unit generates a differential filter frame as the feature extraction frame by subjecting the special frame to a differential filter process.

(4) The image processing device according to any one of (1) to (3), in which the compositing unit subjects the ordinary frames to a superposing compositing process or a marking compositing process as the image compositing process.

(5) The image processing device according to (4), in which as the superposing compositing process, the compositing unit adds the motion-corrected special frame to the ordinary frames according to the motion-corrected feature extraction frame.

(6) The image processing device according to (4), in which as the marking compositing process, the compositing unit subjects the ordinary frames to a color conversion process according to the motion-corrected feature extraction frame.

(7) The image processing device according to any one of (4) to (6), in which the compositing unit subjects the ordinary frames to a superposing compositing process or a marking compositing process as the image compositing process according to a selection by a user.

(8) The image processing device according to any one of (1) to (7), further including a motion vector correction unit which corrects the detected motion vectors based on the plurality of motion vectors that are consecutively detected.

(9) An image processing method performed by an image processing device, the method including inputting ordinary frames in a state in which an object is irradiated with ordinary light, and a special frame in a state in which the object is irradiated with special light, which are imaged consecutively at a predetermined ratio according to a predetermined frame period; detecting motion vectors of the object from a plurality of the ordinary frames with different imaging timing; subjecting the special frame to motion correction corresponding to the imaging timing of the ordinary frames based on the detected motion vectors; and subjecting the ordinary frames to an image compositing process based on the special frame.

(10) A program for causing a computer to function as an input unit which inputs ordinary frames in a state in which an object is irradiated with ordinary light, and a special frame in a state in which the object is irradiated with special light, which are imaged consecutively at a predetermined ratio according to a predetermined frame period; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

(11) An endoscope device, including a light source unit which irradiates an object with ordinary light or special light; an imaging unit which consecutively images, at a predetermined ratio according to a predetermined frame period, ordinary frames in a state in which the object is irradiated with the ordinary light, and a special frame in a state in which the object is irradiated with the special light; a detection unit which detects motion vectors of the object from a plurality of the ordinary frames with different imaging timing; a motion correction unit which subjects the special frame to motion correction corresponding to the imaging timing of the ordinary frames based on the detected motion vectors; and a compositing unit which subjects the ordinary frames to an image compositing process based on the special frame.

It should be understood by those skilled in the art that various modifications, combinations, sub-combinations and alterations may occur depending on design requirements and other factors insofar as they are within the scope of the appended claims or the equivalents thereof.

What is claimed is:

1. A medical image processing system comprising:
a light source which irradiates an object with ordinary light or special light;
circuitry configured to:
input ordinary frames in a state in which the object is irradiated with the ordinary light, and special frames in another state in which the object is irradiated with the special light, which visualizes particular parts of the object more vividly than the rest of the object;
detect motion vectors of the ordinary frames at different imaging timings;
subject the ordinary frames to motion corrections based on the motion vectors detected at the different imaging timings;
align a position of one of the special frames into a corresponding position of one of the ordinary frames; and
combine the one of the ordinary frames and the one of the special frames, to visually differentiate the particular parts of the object from the rest of the object during a medical operation.

2. The medical image processing system according to claim 1, wherein the circuitry is further configured to subject the ordinary frames to a superposing compositing process or a marking compositing process based on the special frames.

3. The medical image processing system according to claim 1, wherein the ordinary frames are imaged for continuous frames and a special frame is imaged periodically between the ordinary frames.

4. The medical image processing system according to claim 3, wherein an imaging ratio of the ordinary frames to the special frames is a variable.

5. The medical image processing system according to claim 1, wherein the circuitry is further configured to capture the ordinary frames and the special frames in a time sequential manner.

6. The medical image processing system according to claim 1, wherein the circuitry is further configured to subject the ordinary frames to a pseudo color conversion using a color matrix process according to color conversion coefficients.

7. The medical image processing system according to claim 6, wherein a degree of the pseudo color conversion is controlled according to pixel values of a differential filter frame.

8. The medical image processing system according to claim 7, wherein the circuitry is further configured to generate the differential filter frame by subjecting the special frames to a differential filter process.

9. The medical image processing system according to claim 1, wherein the circuitry is further configured to subject the special frames to motion corrections based on corresponding motion vectors obtained from the ordinary frames.

10. The medical image processing system according to claim 1, wherein the circuitry is further configured to generate a feature extraction frame in which contours of the object are emphasized by subjecting the special frames to a differential filter process and further subject the ordinary frames to a superposing composition process based on the feature extraction frame.

11. An image processing method comprising:
inputting ordinary frames in a state in which an object is irradiated with ordinary light, and special frames in another state in which the object is irradiated with special light, which visualizes particular parts of the object more vividly than the rest of the object;
detecting motion vectors of the ordinary frames at different imaging timings;

subjecting the ordinary frames to motion corrections based on the motion vectors detected at the different imaging timings;

aligning a position of one of the special frames into a corresponding position of one of the ordinary frames; and combining the one of the ordinary frames and the one of the special frames, to visually differentiate the particular parts of the object from the rest of the object during a medical operation.

12. The image processing method according to claim 11, further comprising:
subjecting the ordinary frames to a superposing compositing process or a marking compositing process based on the special frames.

13. The image processing method according to claim 11, further comprising:
imaging the ordinary frames for continuous frames and imaging a special frame periodically between the ordinary frames.

14. The image processing method according to claim 13, further comprising:
varying an imaging ratio of the ordinary frames to the special frames.

15. The image processing method according to claim 11, further comprising:
capturing the ordinary frames and the special frames in a time sequential manner.

16. The image processing method according to claim 11, further comprising:
subjecting the ordinary frames to a pseudo color conversion using a color matrix process according to color conversion coefficients.

17. The image processing method according to claim 16, further comprising:
controlling a degree of the pseudo color conversion according to pixel values of a differential filter frame.

18. The image processing method according to claim 17, further comprising:
generating the differential filter frame by subjecting the special frames to a differential filter process.

19. The image processing method according to claim 11, further comprising:
subjecting the special frames to motion corrections based on corresponding motion vectors obtained from the ordinary frames.

20. A medical image processing apparatus, comprising:
circuitry configured to:
input ordinary frames in a state in which an object is irradiated with ordinary light, and special frames in another state in which the object is irradiated with special light, which visualizes particular parts of the object more vividly than the rest of the object;

detect motion vectors of the ordinary frames at different imaging timings;

subject the ordinary frames to motion corrections based on the motion vectors detected at the different imaging timings;

align a position of one of the special frames into a corresponding position of one of the ordinary frames; and combine the one of the ordinary frames and the one of the special frames, to visually differentiate the particular parts of the object from the rest of the object during a medical operation.

* * * * *